United States Patent
Thorgrimsson et al.

(10) Patent No.: US 9,736,135 B2
(45) Date of Patent: Aug. 15, 2017

(54) METHOD, APPARATUS, AND SYSTEM FOR ESTABLISHING A VIRTUAL TETHER BETWEEN A MOBILE DEVICE AND A SEMICONDUCTOR PROCESSING TOOL

(71) Applicant: Lam Research Corporation, Fremont, CA (US)

(72) Inventors: Chris Thorgrimsson, San Ramon, CA (US); Chad Weetman, Pleasanton, CA (US); Paul Ballintine, Pleasanton, CA (US); Vincent Wong, Pleasanton, CA (US); Chung Ho Huang, San Jose, CA (US); Henry T. Chan, San Jose, CA (US)

(73) Assignee: LAM RESEARCH CORPORATION, Fremont, CA (US)

( * ) Notice: Subject to any disclaimer, the term of this patent is extended or adjusted under 35 U.S.C. 154(b) by 397 days.

(21) Appl. No.: 14/517,145

(22) Filed: Oct. 17, 2014

(65) Prior Publication Data

US 2016/0112390 A1    Apr. 21, 2016

(51) Int. Cl.
*H04L 29/06* (2006.01)
*H04W 4/00* (2009.01)

(52) U.S. Cl.
CPC ........... *H04L 63/08* (2013.01); *H04W 4/008* (2013.01)

(58) Field of Classification Search
None
See application file for complete search history.

(56) References Cited

U.S. PATENT DOCUMENTS

| | | | |
|---|---|---|---|
| 4,593,273 A | 6/1986 | Narcisse | |
| 7,042,360 B2 | 5/2006 | Light et al. | |
| 8,284,068 B2 | 10/2012 | Johnson | |
| 8,332,106 B2 | 12/2012 | Yuet et al. | |
| 9,420,083 B2 * | 8/2016 | Roberts | G08B 21/182 |
| 2003/0228846 A1 * | 12/2003 | Berliner | G01S 11/06 455/67.11 |
| 2005/0005874 A1 * | 1/2005 | Light | A01K 15/021 119/719 |
| 2010/0029200 A1 * | 2/2010 | Varriale | G06F 21/34 455/41.1 |
| 2014/0059347 A1 * | 2/2014 | Dougherty | H04W 12/06 713/168 |
| 2014/0137235 A1 | 5/2014 | Horton | |
| 2016/0378992 A1 * | 12/2016 | Nguyen | G06F 21/575 726/19 |

* cited by examiner

*Primary Examiner* — Amir Mehrmanesh

(57) ABSTRACT

A method for establishing a virtual tether between a mobile device and a semiconductor processing tool, the method including: obtaining, by a mobile device, a unique key associated with the semiconductor processing tool; establishing a unique pairing between the mobile device and the semiconductor processing tool based on the unique key that is obtained by the mobile device; in response to successfully establishing the unique pairing, authenticating a user of the mobile device for access to the semiconductor processing tool; in response to successfully authenticating the user, performing resource arbitration on the semiconductor processing tool which includes reserving one or more resources associated with the semiconductor processing tool based on a level of access granted to the user; monitoring an activity level of the mobile device over a period of time; and comparing the activity level to a predetermined activity level threshold.

20 Claims, 7 Drawing Sheets

US 9,736,135 B2

METHOD, APPARATUS, AND SYSTEM FOR ESTABLISHING A VIRTUAL TETHER BETWEEN A MOBILE DEVICE AND A SEMICONDUCTOR PROCESSING TOOL

BACKGROUND

During the fabrication of semiconductor devices, it is possible to control semiconductor equipment (i.e. processing chambers called "tools" that are used to manufacture semiconductor devices) over a wireless network by a mobile device. However, controlling semiconductor processing tools remotely poses several safety risks that are not addressed by current technology.

SUMMARY

According to one embodiment, a method for establishing a virtual tether between a mobile device and a semiconductor processing tool, includes: obtaining, by a mobile device, a unique key associated with the semiconductor processing tool; establishing a unique pairing between the mobile device and the semiconductor processing tool based on the unique key that is obtained by the mobile device; in response to successfully establishing the unique pairing between the mobile device and the semiconductor processing tool, authenticating a user of the mobile device for access to the semiconductor processing tool; in response to successfully authenticating the user, performing resource arbitration on the semiconductor processing tool which includes reserving one or more resources associated with the semiconductor processing tool based on a level of access granted to the user; monitoring an activity level of the mobile device over a period of time; and comparing the activity level to a predetermined activity level threshold.

According to another embodiment, a semiconductor processing tool that is virtually tethered to a mobile device includes: a memory device storing a unique key associated with the semiconductor processing tool; a transmitter configured to transmit the unique key to the mobile device, wherein a unique pairing is established between the mobile device and the semiconductor processing tool based on the unique key that is transmitted by the semiconductor processing tool, and in response to successfully establishing the unique pairing between the mobile device and the semiconductor processing tool, authenticating a user of the mobile device for access to the semiconductor processing tool; and a processor configured to, in response to successfully authenticating the user, perform resource arbitration which includes reserving one or more resources associated with the semiconductor processing tool based on a level of access granted to the user, wherein an activity level of the mobile device is monitored over a period of time, and the activity level is compared to a predetermined activity level threshold.

A further embodiment is directed to a system for establishing a virtual tether between a mobile device and a semiconductor processing tool, the system including: the semiconductor processing tool that includes a transmitter configured to transmit a unique key associated with the semiconductor processing tool to the mobile device; and the mobile device that is configured to: establish a unique pairing between the mobile device and the semiconductor processing tool based on the unique key that is obtained by the mobile device, and authenticate, in response to successfully establishing the unique pairing between the mobile device and the semiconductor processing tool, a user of the mobile device for access to the semiconductor processing tool. The semiconductor processing tool is configured to, in response to successful authentication of the user, perform resource arbitration which includes reserving one or more resources associated with the semiconductor processing tool based on a level of access granted to the user. The mobile device is configured to monitor the activity level of the mobile device over a period of time; and the mobile device is configured to compare the activity level to a predetermined activity level threshold.

These and other exemplary features and advantages of particular embodiments of the method, device, and system for establishing a virtual tether between a mobile device and a semiconductor processing tool will now be described by way of exemplary embodiments to which they are not limited.

BRIEF DESCRIPTION OF THE DRAWINGS

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Figure 1:
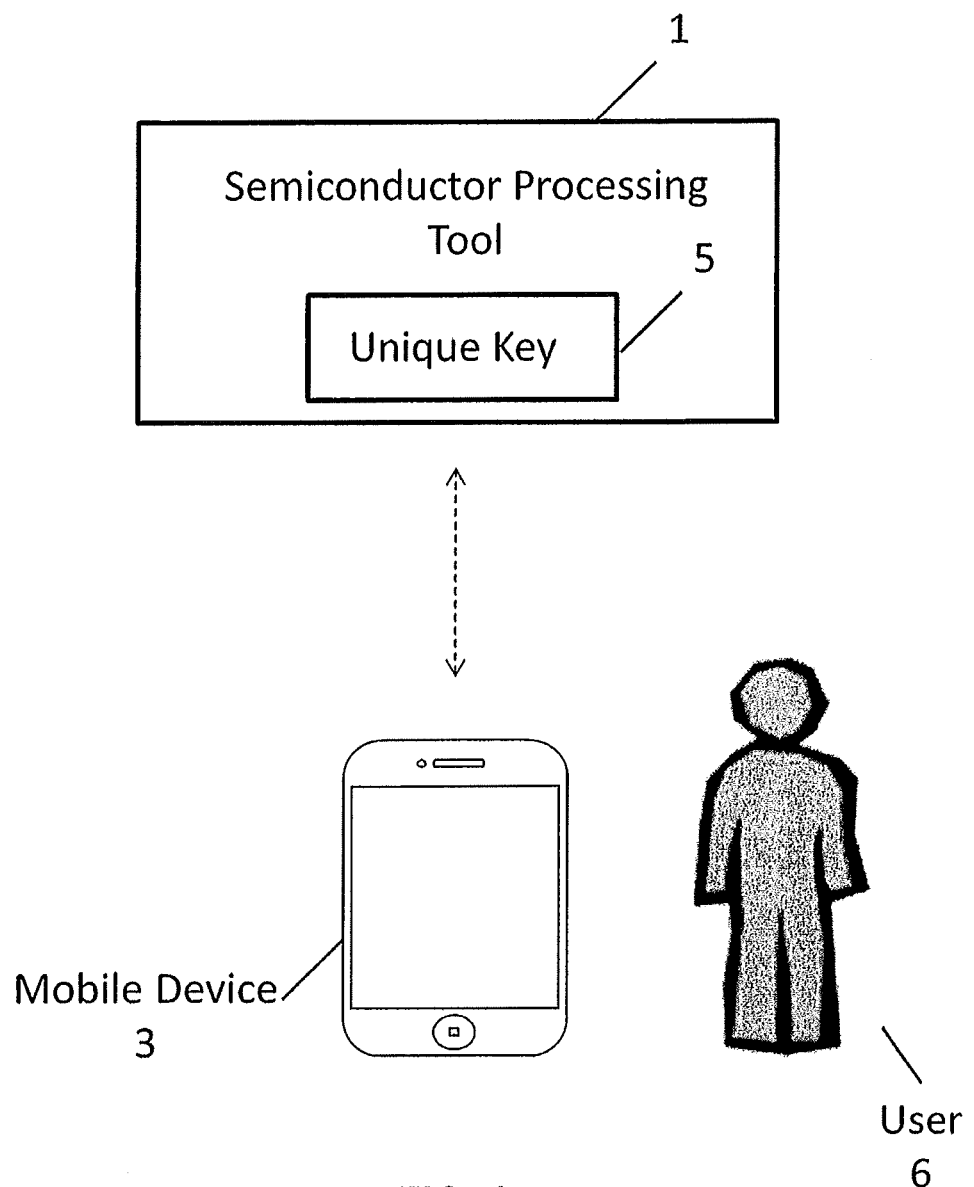
FIG. 1 illustrates a system architecture that may be employed in accordance with an exemplary embodiment.

The present disclosure is directed to a method, apparatus, and system for establishing a virtual tether between a mobile device 3 and semiconductor processing tool 1, as shown in FIG. 1. In a non-limiting embodiment, the mobile device 3 can be, e.g., a tablet, smartphone, laptop, any mobile computing device, etc. The mobile device 3 is used to control operations of the semiconductor processing tool 1 by wireless communications between the mobile device 3 and the semiconductor processing tool 1. For example, the mobile device 3 can turn the semiconductor processing tool 1 on or off, control the semiconductor processing tool 1 to perform various tasks and/or processes involved in manufacturing semiconductor devices, etc. The virtual tether between the mobile device 3 and the semiconductor processing tool 1 advantageously allows for greater safety of the people that are using or in close proximity to the semiconductor processing tool 1, and prevents potential misuse and damage to the semiconductor processing tool 1.

For example, semiconductor processing facilities (fabs) can include various process lines with integrated process chambers (or tools) that are used to manufacture semiconductor devices), and each semiconductor processing tool 1 is controlled by an associated mobile device 3 such as a tablet, a dangerous situation can exist if the two tablets become mixed up. For instance, if two engineers are performing maintenance on separate semiconductor processing tools that are both controlled with identical looking tablets which are connected to their respective semiconductor processing tools via a Wi-Fi connection, and both engineers leave their work area for some reason and place their tablet within close proximity of the other tablet, each engineer could unknowingly retrieve the wrong tablet when they return. If the wrong tablets are retrieved by the engineers, and if one of the engineers has his hand in a first processing chamber, commonly referred to as a "tool" in the semiconductor industry, to install or clean a component of during a maintenance operation and the other engineer activates a mechanical system of the same processing chamber, thinking he is controlling a component of a second processing chamber, serious injury can occur to the engineer that is working on the first processing chamber. This situation can be avoided by a virtual tether being established between the tablet and the respective semiconductor processing tool it controls as described in detail below. A physical tether would be a piece of rope, wire, chain, etc. tying the mobile device 3 to the semiconductor processing tool 1 that it is used to control. In contrast, a virtual tether electronically mates and links the mobile device 3 to the semiconductor processing tool 1 that it is used to control. The virtual tether helps prevent accidents, removes confusion as to which piece of semiconductor processing tool 1 is controlled by the mobile device 3, and makes sure that the mobile device 3 is tethered to the correct piece of semiconductor processing tool 1.

In an exemplary embodiment, a process of establishing a virtual tether between the mobile device 3 and the semiconductor processing tool 1 involves a series of steps that the mobile device 3 performs using onboard hardware devices in order to tether itself to the semiconductor processing tool 1. The process can be a manual process, semi-automated process, or an automated process.

In an exemplary embodiment, the process of establishing a virtual tether between the mobile device 3 and the semiconductor processing tool 1 involves some or all of the following steps: 1) handshake step; 2) login step; 3) resource arbitration step; 4) activity detection step; and 5) logout step. These steps are performed after the mobile device 3 and the semiconductor processing tool 1 have already joined a common Wi-Fi or other wireless communications network.

Figure 4A:
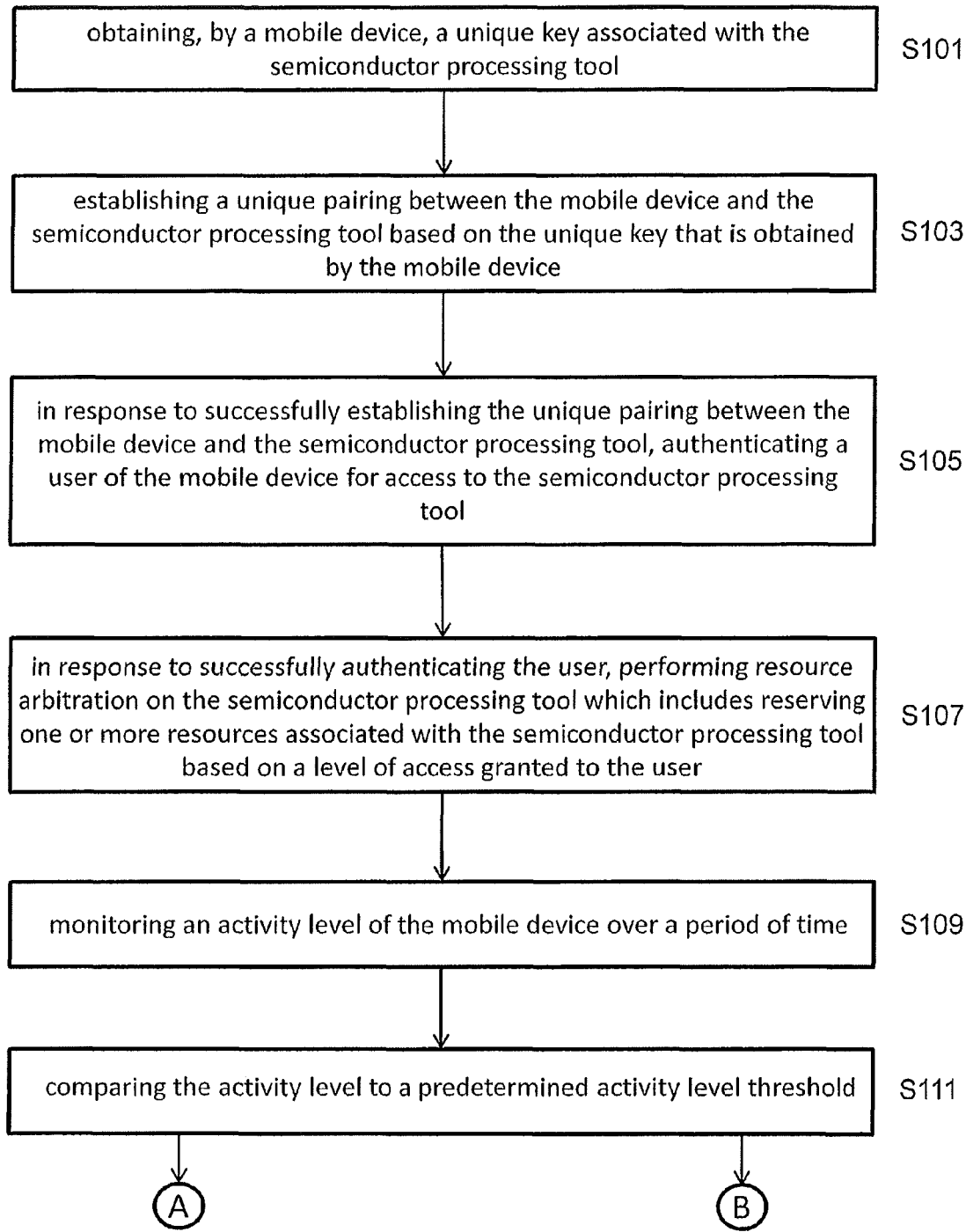
FIGS. 4A-4B contain a flow chart illustrating an exemplary method of an embodiment.

In an exemplary embodiment, the handshake step is a handshake that occurs between the mobile device 3 and the semiconductor processing tool 1, and includes obtaining, by the mobile device 3, a unique key 5 associated with the semiconductor processing tool 1, as shown in step S101 of FIG. 4A. In an exemplary embodiment, the unique key 5 is received from the semiconductor processing tool 1. For example, the unique key 5 can be stored or present in the semiconductor processing tool 1 as shown in FIG. 1. Once the unique key 5 is received by the mobile device 3, a unique pairing is established between the mobile device 3 and the semiconductor processing tool 1 based on the unique key 5 that is obtained by the mobile device 3, as shown in step S103 of FIG. 4A. In an exemplary embodiment, hardware devices (camera, Near Field Communication reader, etc.) contained in the mobile device 3 are used to retrieve the unique key 5 from the semiconductor processing tool 1.

Exemplary unique key exchange methods will be discussed next. In an exemplary embodiment, the obtaining of the unique key 5 is performed based on one of the following: a near field communication, a radio-frequency identification communication, a Bluetooth communication, and a Wi-Fi communication.

In an exemplary embodiment, a built-in or external camera connected to the mobile device 3 scans and decodes a Quick Response Code (QR code) that is displayed on a display screen (e.g., the main user interface, etc.) of the semiconductor processing tool. The QR code that is scanned by the camera contains the unique key 5 of the semiconductor processing tool 1. A QR code is a machine-readable optical label that contains information about the item to which it is attached. A QR code can use, for example, four standardized encoding modes (numeric, alphanumeric, byte/binary, and kanji) to efficiently store data; extensions may also be used.

In an exemplary embodiment, the mobile device 3 uses a built-in Near Field Communication (NFC) reader to read a NFC tag that is attached to the semiconductor processing tool 1. In an exemplary embodiment, the NFC tag can be stored in a device that is external to the semiconductor processing tool 1, but in close proximity to the semiconductor processing tool 1. The NFC tag is encoded with the unique key 5 associated with that particular semiconductor processing tool 1.

In an exemplary embodiment, the mobile device uses a Radio Frequency ID (RFID) reader to read an RFID tag that is attached to the semiconductor processing tool 1. In an exemplary embodiment, the RFID tag can be stored in a device that is external to the semiconductor processing tool 1, but in close proximity to the semiconductor processing tool 1. The RFID tag is encoded with the unique key 5 associated with that particular semiconductor processing tool 1.

In another exemplary embodiment, the user 6 manually enters the unique key 5 into the mobile device 3 using an input device 21 (keyboard, touch screen, trackball, etc.) of the mobile device 3. The user 6 obtains the unique key 5 as it is displayed on a display screen of the semiconductor processing tool 1. In an exemplary embodiment, the unique key 5 can be printed on a label or piece of paper attached to the semiconductor processing tool 1 or obtained in any other manner.

In an exemplary embodiment, if the above handshake step is not successful, the process does not proceed onto the next step (e.g., the login step).

The login step will be explained next. This stage of the process establishes a user's access level, i.e. establishes what functions/operations a user is allowed to perform on the semiconductor processing tool 1. In a non-limiting embodiment, in response to successfully establishing the unique pairing between the mobile device 3 and the semiconductor processing tool 1, a user 6 of the mobile device 3 is authenticated for access to the semiconductor processing tool 1, as shown in step S105 of FIG. 4A. In an exemplary embodiment, the authenticating includes comparing a login and password received from the mobile device 3 with a stored login and password. If the logins and passwords match, the user 6 is authenticated and has access to the semiconductor processing tool 1. The user can also be authenticated in a different manner than by login and password, for example, by biometric data, etc. In an exemplary embodiment, if the above login step is not successful, the process does not proceed onto the next step (e.g., the arbitration step).

The arbitration step will be explained next. This stage of the process establishes which parts of the machine the user wishes to take control of (e.g. reserve, designate, or "lock"). For example, if the user wishes to lock all access to PM1 of a 4 PM system so that they are the only ones who can control that PM, they can do so during the arbitration step. The user 6 uses their mobile device 3 and selects from a list of possible resources of the semiconductor processing tool 1 the ones they wish to reserve or "lock" access to. In other words, the arbitration step reserves ("locks") specific resources to a particular user. The arbitration step avoids problems that can occur when a mobile device is lost or a mobile device is defective or crushed. In an exemplary embodiment, the arbitration step only lets one user operate the semiconductor processing tool 1, and keeps others (boss, administrator, etc.) from using the semiconductor processing tool 1. However, a super-user can kick other users off the semiconductor processing tool 1.

In an exemplary embodiment, in response to successfully authenticating the user 6, resource arbitration is performed on the semiconductor processing tool 1 which includes reserving one or more resources associated with the semiconductor processing tool 1 based on a level of access granted to the user 6, as shown in step S107 of FIG. 4A. In an exemplary embodiment, the reserving of the one or more resources associated with the semiconductor processing tool 1 includes setting the mobile device 3 to have a master access level. In an exemplary embodiment, the reserving of the one or more resources associated with the semiconductor processing tool 1 includes setting the mobile device 3 to an intermediate or shared access level. In a non-limiting embodiment, after the authenticating of the user, the semiconductor processing tool 1 is controlled with the mobile device 3. For example, an application or other program can run on the mobile device 3 which allows the user to control one or more operations of the semiconductor processing tool 1.

The activity detection step will be explained next. This stage of the process monitors a user's activity on the mobile device 3 for the purpose of ensuring continued use of the mobile device 3. During the activity detection step, hardware devices on the mobile device are continually monitored to verify user activity on the mobile device 3. If no activity is detected for a pre-determined amount of time, the process will proceed to the logout step. In an exemplary embodiment, an activity level of the mobile device 3 is monitored over a period of time, as shown in step S109 of FIG. 4A. Next, the activity level is compared to a predetermined activity level threshold, as shown in step S111 of FIG. 4A. In an exemplary embodiment, the monitoring of an activity level is based on sensor data obtained from one or more sensors 19 within the mobile device 3. The one or more sensors 19 within the mobile device 3 can be one or more of a GPS sensor, an accelerometer, a temperature sensor, a humidity sensor, a barometer, and one or more environmental sensors. The one or more sensors 19 could also be any other sensor that detects activity of a user on a mobile device or movement of the mobile device.

In an exemplary embodiment, the monitoring of the activity level of the mobile device 3 includes registering a time of a last input by the user 6 on the mobile device 3. In an exemplary embodiment, the comparing includes determining whether the activity level is greater than or equal to the predetermined activity level threshold, and when the activity level is determined to be greater than or equal to the predetermined activity level threshold, maintaining the reservation of the one or more resources associated with the semiconductor processing tool 1, as shown in step S113 of FIG. 4B.

The logout step will be described next. This stage of the process accomplishes the following: 1) releases all resource arbitration locks on the semiconductor processing tool 1 that a user 6 may have established in the arbitration step; 2) removes any access level that was established in the login step; and 3) breaks the unique pairing between the mobile device 3 and semiconductor processing tool 1 established in the handshake step. In an exemplary embodiment, the comparing includes determining whether the activity level is less than the predetermined activity level threshold, and when the activity level is determined to be less than the predetermined activity level threshold, revoking the reservation of the one or more resources associated with the semiconductor processing tool 1, as shown in step S115 in FIG. 4B. In an exemplary embodiment, the revoking the reservation includes logging the user 6 off of the mobile device 3, releasing the one or more reserved resources, and breaking the unique pairing between the mobile device 3 and the semiconductor processing tool 1.

In an exemplary embodiment, the distance of the mobile device 3 from the semiconductor processing tool 1 is monitored, and the virtual tether between the mobile device 3 and the semiconductor processing tool 1 can be broken (and subsequent communications between these devices) when the distance is greater than a predetermined threshold distance. Also, in a non-limiting embodiment, the reserving of the one or more resources can be revoked by a remote device associated with a master user, and the unique pairing between the mobile device 3 and the semiconductor processing tool 1 can be broken by the master user. Once the virtual tether is established by the above-described processes, potential safety risks when using the mobile device 3 to control the semiconductor processing tool 1 are mitigated.

Figure 4B:
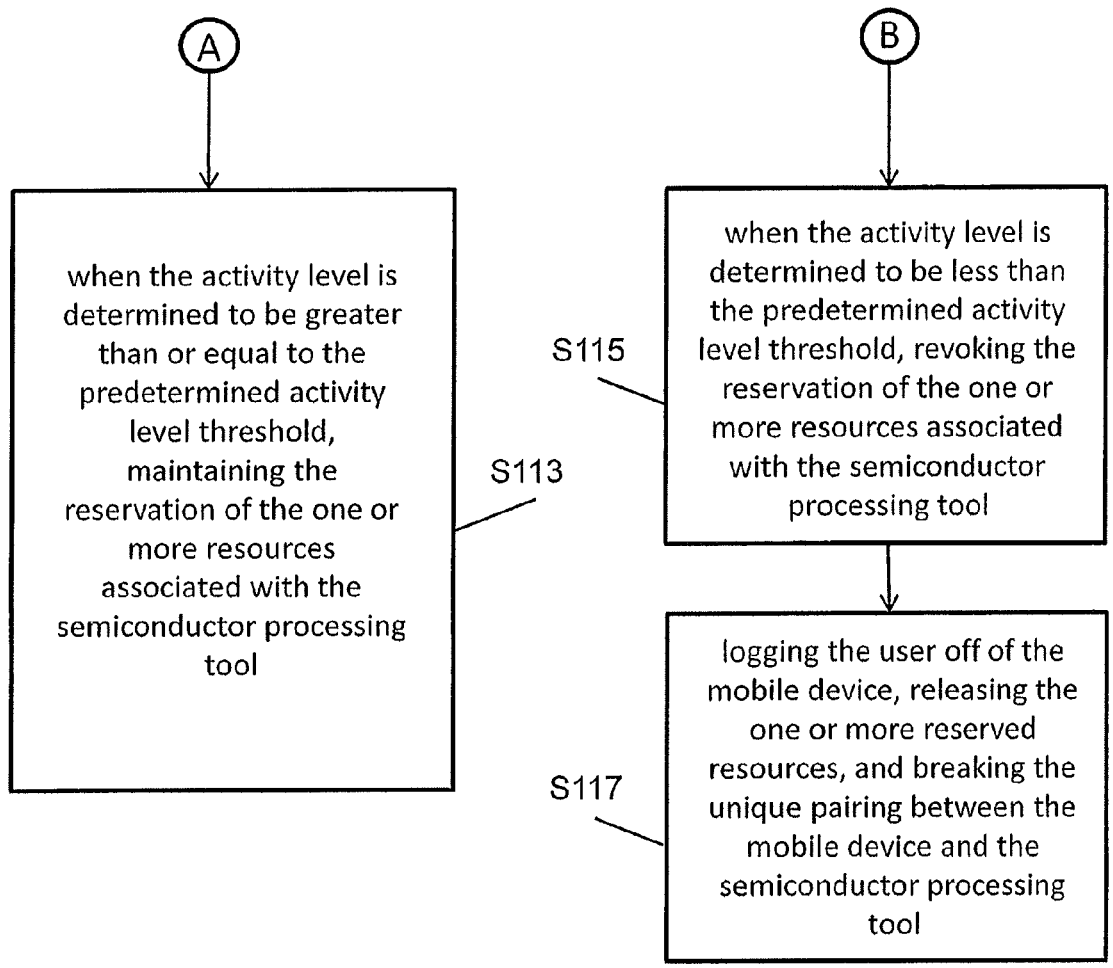
Figure 5B:
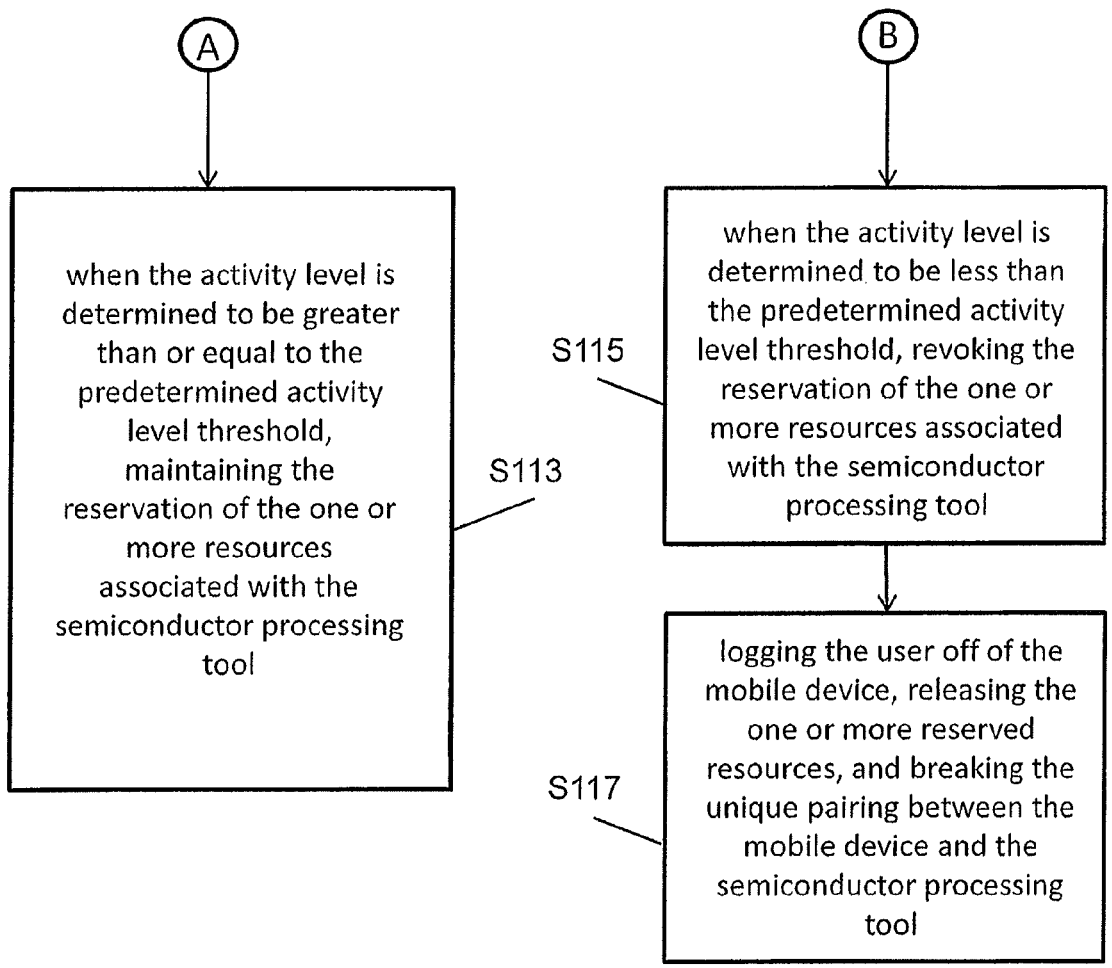
FIGS. 5A-5B contain a flow chart illustrating an exemplary method of an embodiment.
Figure 5A:
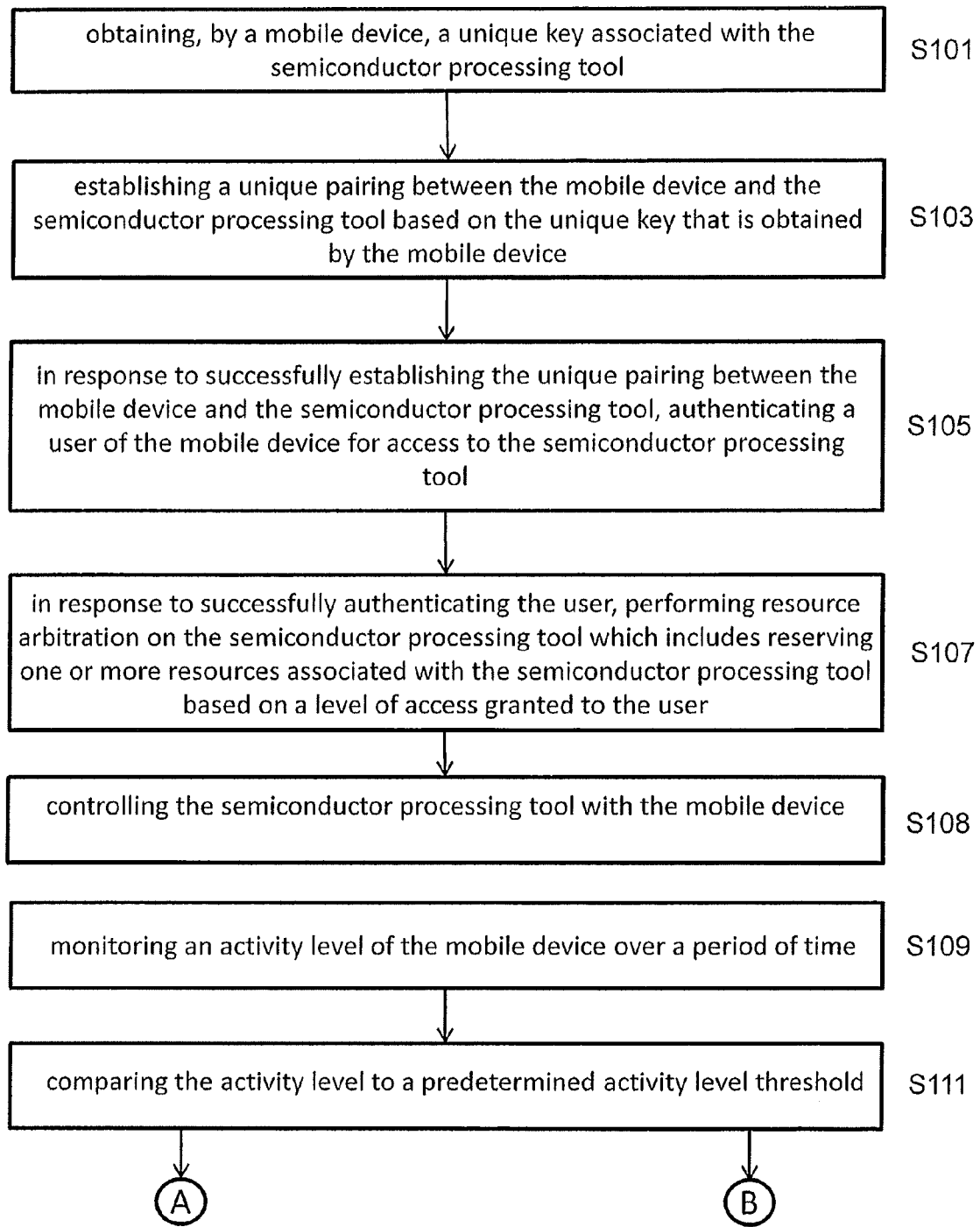

The processes shown in FIGS. 5A and 5B are the same as the processes shown in FIGS. 4A and 4B, except that a step S108 is added where the semiconductor processing tool 1 is controlled with the mobile device 3.

Figure 2:
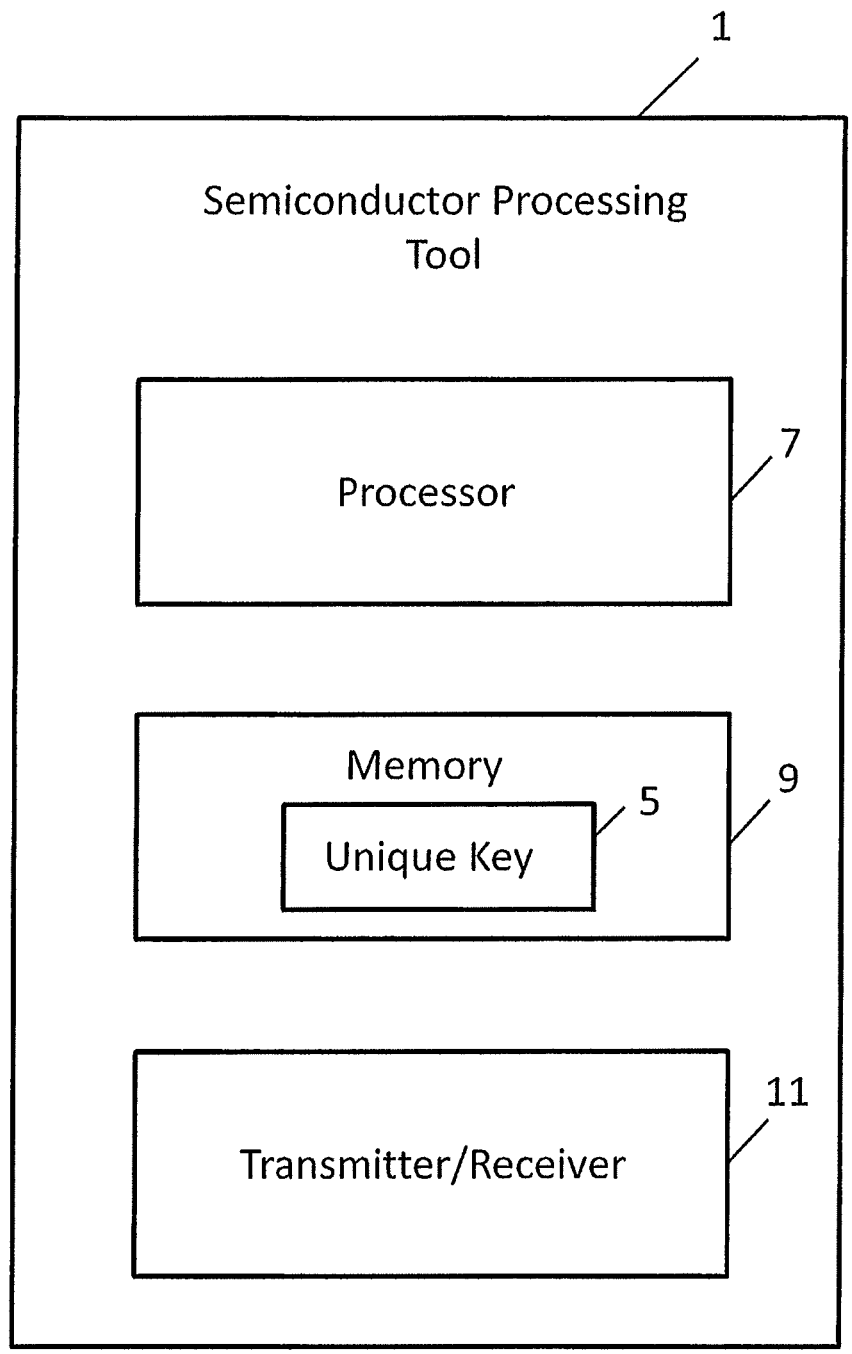
FIG. 2 illustrates a semiconductor processing tool used in an exemplary embodiment.

FIG. 2 illustrates an exemplary embodiment of a semiconductor processing tool 1. The semiconductor processing tool 1 can comprise a processing chamber (such as a plasma etch chamber or chemical vapor deposition chamber) having an RF source, process gas supply, semiconductor substrate support, wafer port, monitoring sensors, and controller having at least a processor 7, a memory 9 storing the unique key 5, and a transmitter/receiver unit 11 that transmits and receives data signals (e.g., wireless data signals). The processor 7 can be a computer processor that may be a single processor, a plurality of processors, or combinations thereof. The processor 7 may have one or more processor "cores." The processor 7 may be a special purpose or a general purpose processor device. The processor 7 may be connected to a communication infrastructure, such as a bus, message queue, network, multi-core message-passing scheme, etc. The memory 9 is a storage device for storing data, such as a hard drive, read-only memory (ROM), random-access memory (RAM), optical drive, flash memory, magnetic tape drive, etc.

In an exemplary embodiment shown in FIG. 2, a semiconductor processing tool 1 that is virtually tethered to a mobile device 3 includes the memory device 9 storing the unique key 5 associated with the semiconductor processing tool 1. The semiconductor processing tool 1 also includes the transmitter 11 configured to transmit the unique key 5 to the mobile device 3, and a unique pairing is established between the mobile device 3 and the semiconductor processing tool 1 based on the unique key 5 that is transmitted by the semiconductor processing tool 1. In response to successfully establishing the unique pairing between the mobile device 3 and the semiconductor processing tool 1, a user 6 of the mobile device 3 is authenticated for access to the semiconductor processing tool 1. The semiconductor processing tool 1 further includes a processor 7 configured to, in response to successfully authenticating the user 6, perform resource arbitration which includes reserving one or more resources associated with the semiconductor processing tool 1 based on a level of access granted to the user 6. An activity level of the mobile device 3 is monitored over a period of time, and the activity level is compared to a predetermined activity level threshold. When the activity level is determined to be greater than or equal to the predetermined activity level threshold, the reservation of the one or more resources associated with the semiconductor processing tool 1 is maintained. When the activity level is determined to be less than the predetermined activity level threshold, the reservation of the one or more resources associated with the semiconductor processing tool 1 is revoked, as described above.

Figure 3:
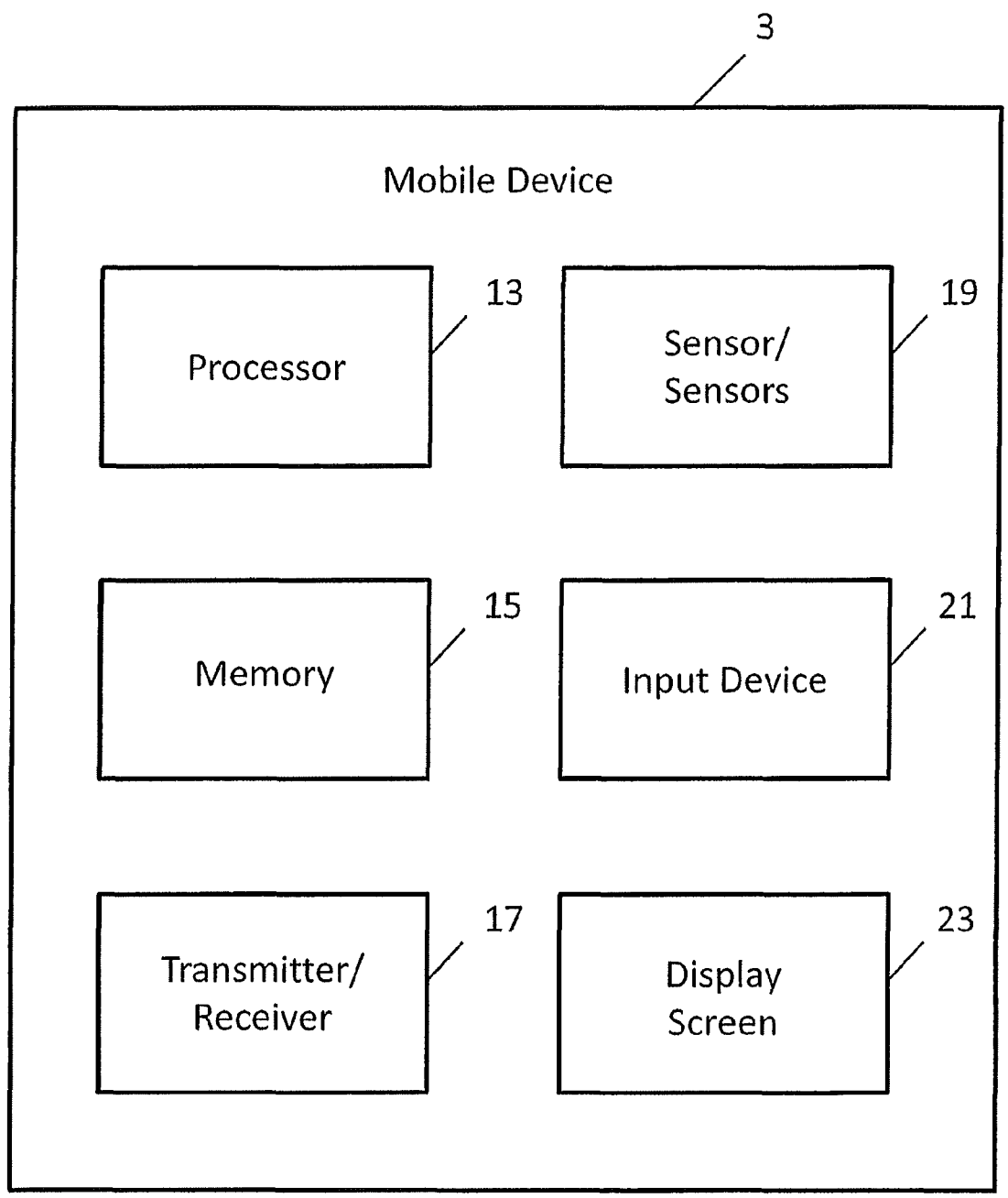
FIG. 3 illustrates a mobile device used in an exemplary embodiment.

FIG. 3 illustrates an exemplary embodiment of a mobile device 3 used in the described methods. The mobile device 3 can include all or some of the following devices: a processor 13, a memory 15, a transmitter/receiver 17, a sensor/sensors 19, an input device 21, and a display screen 23. The processor 13 can be a computer processor that may be a single processor, a plurality of processors, or combinations thereof. The processor 13 may have one or more processor "cores." The processor 13 may be a special purpose or a general purpose processor device. The processor 13 may be connected to a communication infrastructure, such as a bus, message queue, network, multi-core message-passing scheme, etc. The memory 15 is a storage device for storing data, such as a hard drive, read-only memory (ROM), random-access memory (RAM), optical drive, flash memory, magnetic tape drive, etc. The transmitter/receiver unit 11 transmits and receives data signals (e.g., wireless data signals). The sensor or sensors can be one or more of a GPS sensor, an accelerometer, a temperature sensor, a humidity sensor, a barometer, one or more environmental sensor, or any other sensor that detects activity of a user on a mobile device or movement of the mobile device. As described above, the input device can be a keyboard, touch screen, trackball, etc. that is used to operate the mobile device 3, and in turn, operate the semiconductor processing tool 1. The display screen 23 can be, for example, a LCD, LED, OLED, etc.

An exemplary system for establishing a virtual tether between a mobile device 3 and a semiconductor processing tool 1 will now be described. The exemplary system includes the semiconductor processing tool 1, which includes the transmitter 11 configured to transmit the unique key 5 associated with the semiconductor processing tool 1 to the mobile device 3. The system also includes the mobile device 3 that is configured to: establish a unique pairing between the mobile device 3 and the semiconductor processing tool 1 based on the unique key 5 that is obtained by the mobile device 3, and authenticate, in response to successfully establishing the unique pairing between the mobile device 3 and the semiconductor processing tool 1, a user 6 of the mobile device 3 for access to the semiconductor processing tool 1. The semiconductor processing tool 1 is configured to, in response to successful authentication of the user 6, perform resource arbitration which includes reserving one or more resources associated with the semiconductor processing tool 1 based on a level of access granted to the user 6. Also, the mobile device 3 is configured to monitor the activity level of the mobile device 3 over a period of time; and to compare the activity level to a predetermined activity level threshold.

In an exemplary embodiment of the system, when the activity level is determined to be greater than or equal to the predetermined activity level threshold, the reservation of the one or more resources associated with the semiconductor processing tool 1 is maintained.

In an exemplary embodiment, the processor 13 of the mobile device 3 or another controller creates/executes an algorithm that performs the method for establishing a virtual tether between the mobile device 3 and the semiconductor processing tool 1 as described in the exemplary embodiments. In an exemplary embodiment, the algorithm can be stored on the mobile device 3 or stored in a mobile application loaded onto the mobile device 3. In an exemplary embodiment, the mobile device 3 can access a web application that is run on an external server, and the web application performs the methods for establishing a virtual tether between the mobile device 3 and the semiconductor processing tool 1 as described in the exemplary embodiments.

Various embodiments are described in terms of an exemplary mobile device 3 using a processor 13. After reading this description, it will become apparent to a person skilled in the relevant art how to implement such embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged.

In an exemplary embodiment, a non-transitory computer readable storage medium (e.g., a RAM, ROM, DVD, Blu-Ray Disc, etc.), stores instructions, which when executed by a processor (CPU, etc.), performs the methods for establishing a virtual tether between the mobile device 3 and the semiconductor processing tool 1 described above.

While various exemplary embodiments of the disclosed methods have been described above, it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for establishing a virtual tether between a mobile device and a semiconductor processing tool, the method comprising:
   obtaining, by a mobile device, a unique key associated with the semiconductor processing tool;
   establishing a unique pairing between the mobile device and the semiconductor processing tool based on the unique key that is obtained by the mobile device;
   in response to successfully establishing the unique pairing between the mobile device and the semiconductor processing tool, authenticating a user of the mobile device for access to the semiconductor processing tool;
   in response to successfully authenticating the user, performing resource arbitration on the semiconductor processing tool which includes reserving one or more resources associated with the semiconductor processing tool based on a level of access granted to the user;
   monitoring an activity level of the mobile device over a period of time; and
   comparing the activity level to a predetermined activity level threshold, wherein the comparing includes determining whether the activity level is less than the predetermined activity level threshold, and when the activity level is determined to be less than the predetermined activity level threshold, revoking the reservation of the one or more resources associated with the semiconductor processing tool; and wherein the revoking the reservation includes logging the user off of the mobile device, releasing the one or more reserved resources, and breaking the unique pairing between the mobile device and the semiconductor processing tool.

2. The method of claim 1, wherein the comparing includes determining whether the activity level is greater than or equal to the predetermined activity level threshold, and when the activity level is determined to be greater than or equal to the predetermined activity level threshold, maintaining the reservation of the one or more resources associated with the semiconductor processing tool.

3. The method of claim 1, wherein the reserving of the one or more resources associated with the semiconductor processing tool includes setting the mobile device to have (i) a master access level or (ii) an intermediate or shared access level to the semiconductor processing tool.

4. The method of claim 1, further comprising in response to successfully authenticating the user, controlling one or more operations of the semiconductor processing tool with the mobile device.

5. The method of claim 1, wherein the semiconductor processing tool is a plasma etching chamber used for fabricating semiconductor devices.

6. The method of claim 1, wherein the unique key is received from the semiconductor processing tool.

7. The method of claim 1, wherein the obtaining of the unique key is performed based on one of the following: a near-field communication, a radio-frequency identification communication, a Bluetooth communication, and a Wi-Fi communication.

8. The method of claim 1, wherein the monitoring an activity level is based on sensor data obtained from one or more sensors within the mobile device.

9. The method of claim 8, wherein the one or more sensors within the mobile device are selected from the group comprising a GPS sensor, an accelerometer, a temperature sensor, a humidity sensor, a barometer, and one or more environmental sensors.

10. The method of claim 1, wherein the reserving of the one or more resources associated with the semiconductor processing tool includes setting the mobile device to have a master access level.

11. The method of claim 1, wherein the reserving of the one or more resources associated with the semiconductor processing tool includes setting the mobile device to an intermediate or shared access level.

12. The method of claim 1, wherein the authenticating includes comparing a login and password received from the mobile device with a stored login and password.

13. The method of claim 1, wherein the monitoring the activity level of the mobile device includes registering a time of a last input by the user on the mobile device.

14. The method of claim 1, further comprising:
revoking the reserving of the one or more resources by a remote device associated with a master user, and breaking the unique pairing between the mobile device and the semiconductor processing tool.

15. The method of claim 1, further comprising:
after the authenticating of the user, controlling the semiconductor processing tool with the mobile device.

16. A semiconductor processing tool that is virtually tethered to a mobile device, the semiconductor processing tool comprising:
a memory device storing a unique key associated with the semiconductor processing tool;
a transmitter configured to transmit the unique key to the mobile device, wherein a unique pairing is established between the mobile device and the semiconductor processing tool based on the unique key that is transmitted by the semiconductor processing tool, and in response to successfully establishing the unique pairing between the mobile device and the semiconductor processing tool, authenticating a user of the mobile device for access to the semiconductor processing tool; and
a processor configured to, in response to successfully authenticating the user, perform resource arbitration which includes reserving one or more resources associated with the semiconductor processing tool based on a level of access granted to the user, wherein an activity level of the mobile device is monitored over a period of time, and the activity level is compared to a predetermined activity level threshold;
wherein the comparing includes determining whether the activity level is less than the predetermined activity level threshold, and when the activity level is determined to be less than the predetermined activity level threshold, the reservation of the one or more resources associated with the semiconductor processing tool is revoked; and
wherein the revoking the reservation includes releasing the one or more reserved resources, and breaking the unique pairing between the mobile device and the semiconductor processing tool.

17. The semiconductor processing tool of claim 16, wherein when the activity level is determined to be greater than or equal to the predetermined activity level threshold, the reservation of the one or more resources associated with the semiconductor processing tool is maintained.

18. The semiconductor processing tool of claim 16, wherein when the activity level is determined to be less than the predetermined activity level threshold, the reservation of the one or more resources associated with the semiconductor processing tool is revoked.

19. A system for establishing a virtual tether between a mobile device and a semiconductor processing tool, the system comprising:
the semiconductor processing tool that includes a transmitter configured to transmit a unique key associated with the semiconductor processing tool to the mobile device; and
the mobile device that is configured to:
establish a unique pairing between the mobile device and the semiconductor processing tool based on the unique key that is obtained by the mobile device, and
authenticate, in response to successfully establishing the unique pairing between the mobile device and the semiconductor processing tool, a user of the mobile device for access to the semiconductor processing tool;
the semiconductor processing tool is configured to, in response to successful authentication of the user, perform resource arbitration which includes reserving one or more resources associated with the semiconductor processing tool based on a level of access granted to the user;

the mobile device is configured to monitor an activity level of the mobile device over a period of time; and the mobile device is configured to compare the activity level to a predetermined activity level threshold;

wherein the comparing includes determining whether the activity level is less than the predetermined activity level threshold, and when the activity level is determined to be less than the predetermined activity level threshold, the reservation of the one or more resources associated with the semiconductor processing tool is revoked; and wherein the revoking the reservation includes logging the user off of the mobile device, releasing the one or more reserved resources, and breaking the unique pairing between the mobile device and the semiconductor processing tool.

20. The system of claim 19, wherein when the activity level is determined to be greater than or equal to the predetermined activity level threshold, the reservation of the one or more resources associated with the semiconductor processing tool is maintained.

* * * * *